US012737446B2

(12) United States Patent
Lei et al.

(10) Patent No.: US 12,737,446 B2
(45) Date of Patent: Sep. 15, 2026

(54) RELATIONSHIP AND ATTRIBUTE MANAGEMENT USING DECENTRALIZED IDENTIFIERS

(71) Applicant: American Express Travel Related Services Company, Inc., New York, NY (US)

(72) Inventors: Andrew Lei, Brooklyn, NY (US); Mukund Shankar SimhaRaghu, Glendale, AZ (US); Emery Schoenly, Salisbury, CT (US); Steven Todd Johnson, Tempe, AZ (US)

(73) Assignee: AMERICAN EXPRESS TRAVEL RELATED SERVICES, CO., Inc., New York, NY (US)

( * ) Notice: Subject to any disclaimer, the term of this patent is extended or adjusted under 35 U.S.C. 154(b) by 537 days.

(21) Appl. No.: 18/362,022

(22) Filed: Jul. 31, 2023

(65) Prior Publication Data

US 2025/0045374 A1 Feb. 6, 2025

(51) Int. Cl.
*G06F 21/45* (2013.01)
*G06F 21/00* (2013.01)

(52) U.S. Cl.
CPC .................................... *G06F 21/45* (2013.01)

(58) Field of Classification Search
CPC .......... G06F 21/45; G06F 21/30; G06F 21/34; G06F 21/44; G06F 21/604; G06F 21/62; G06F 21/629
See application file for complete search history.

(56) References Cited

U.S. PATENT DOCUMENTS

2015/0089570 A1* 3/2015 Sondhi ................ H04L 63/0815 726/4
2019/0253430 A1* 8/2019 Gamache ................ G06F 21/41

* cited by examiner

*Primary Examiner* — Edward Zee
(74) *Attorney, Agent, or Firm* — Thomas Horstemeyer, LLP

(57) ABSTRACT

Disclosed are various approaches for relationship and attribute management are described. In some examples, a verifier service performs a verification process using a relationship decentralized identifier (DID) that provides proof of a relationship between the holder and a DID management service. An attribute request is that specifies an attribute is transmitted from the verifier service to the DID management service. The DID management service provides the verifier service with information based on the attribute once the holder provides an authorization response that authorizes usage of the attribute.

15 Claims, 7 Drawing Sheets

User Interface 156b

Approve Verifier_2 to Verify(or Access) Attribute_4?

Approve Deny

Verifier_2 has also requested the following unverified information: Select or Enter Option Select or Enter Here User Interface 156d Please Select the Following Alternative/Additional Information For Membership/Network Approval

Form for Attribute_7

Self-Verify Attribute_12

Upload Image for Attribute_11

Upload File for Attribute_13

RELATIONSHIP AND ATTRIBUTE MANAGEMENT USING DECENTRALIZED IDENTIFIERS

BACKGROUND

Decentralized identifiers (DIDs) can refer to unique identifiers that enable an entity to be identified in a manner that is verifiable, persistent, and decentralized. The DIDs can provide a decentralized digital identity that can be utilized for web applications. In some examples, identity verification is sufficient for a service provider. However, in other examples, more information is needed, but is unavailable based on the particular DID provided.

In further examples, in order to obtain a relationship or membership with a network entity, various documents and proofs about the applying enterprise, individual, or other entity. The network entity then needs to review the information before approving and providing membership or relationship credentials. However, manual first-party review can involve a long and inefficient process. The new network-approved status is also not usable outside of the network. Approaches to DID implementations have focused on mobile and web channels as the interaction point for the DID holder and verifier. However, interactions in traditional physical spaces are insufficiently developed. In-person interactions can also be ineffective. As a result, there is a need for further development DID technologies for interactions that include attribute management in various fields.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for relationship and attribute management using decentralized identifiers (DIDs). This can include management using verifiable credentials (VCs) that leverage DIDs to identify various attributes. DIDs can refer to unique identifiers that enable an identity to be identified in a manner that is verifiable, persistent, revocable, and decentralized. However, in some examples, identity verification is insufficient. The present disclosure provides mechanisms that are capable of securely and conveniently providing additional DID-backed verifiable information that is narrowly tailored and fully controlled by a DID holder.

In order to obtain a relationship or membership with a network entity, the applying enterprise, individual, or other entity can provide various documents and proofs that the network entity sets as relationship criteria or preconditions. The network entity then needs to review the information before approving and providing membership or relationship credentials. However, manual first-party review can involve a long and inefficient process. The present disclosure provides mechanisms that are capable of streamlining the membership or relationship process using third-party VCs relative to the network entity, while also providing alternative or fallback review of other documentation where VCs are not available.

Approaches to DID implementations have traditionally focused on mobile and web channels as the interaction point for the DID holder and verifier. Interactions in traditional physical spaces are underdeveloped. The present disclosure provides mechanisms that are capable of integrating DID-backed secure interactions using a physical chip that is integrated into a card or other familiar physical item, which can include unpowered physical items. In-person interactions can also be inefficient when using mobile device wallets. The present disclosure provides mechanisms that are capable of using DID-backed secure information automatically and without user interaction at the point of contact.

In the following discussion, a general description of the DID-backed relationship and attribute management system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
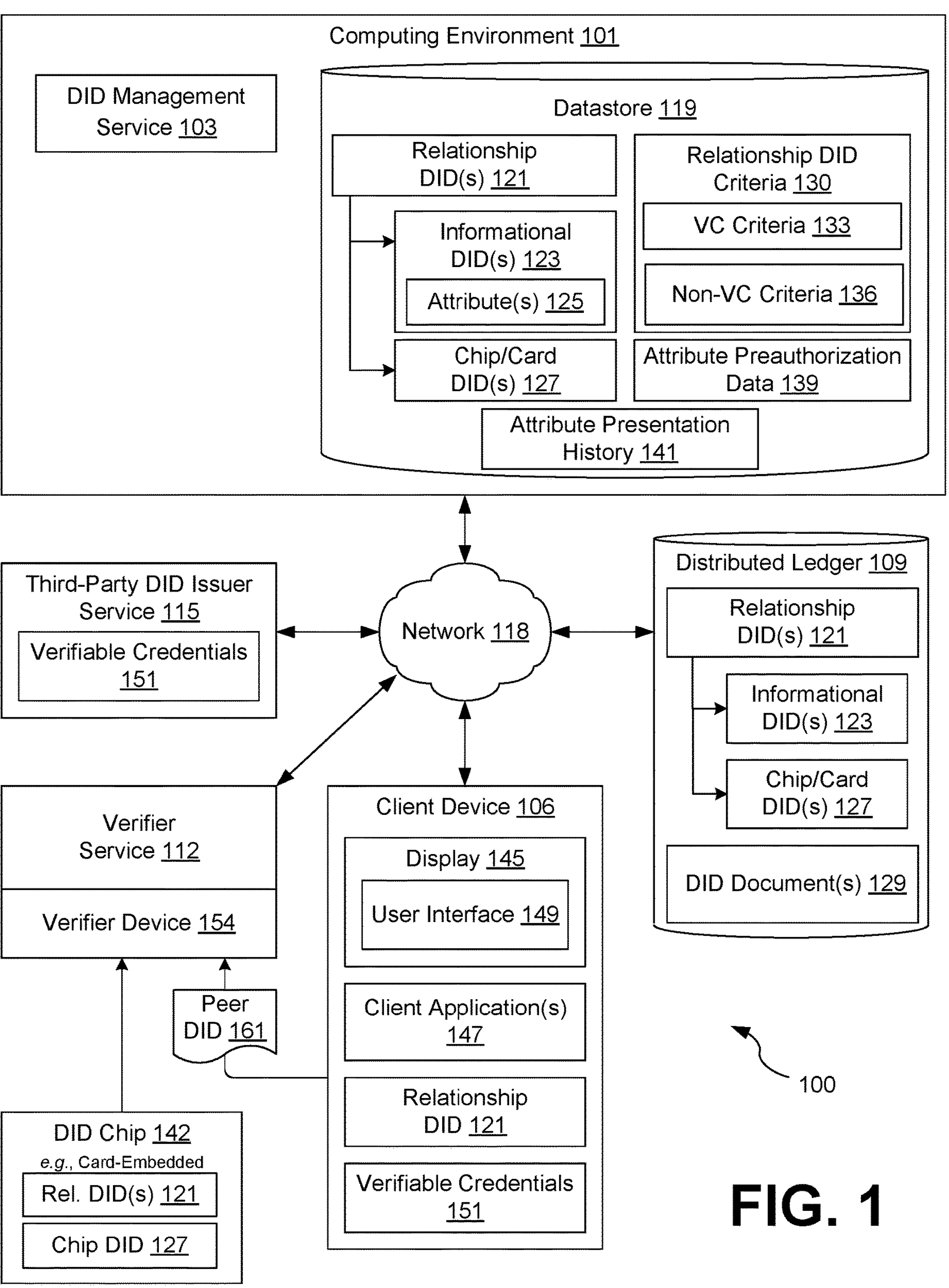
FIG. 1 is a drawing of a networked environment according to various embodiments of the present disclosure.

With reference to FIG. 1, shown is a networked environment 100 according to various embodiments. The networked environment 100 can include a computing environment 101 of a DID management service 103, a client device 106, a distributed ledger 109, a verifier service 112, and a third-party DID issuer service 115, which can be in data communication with each other via a network 118. Although depicted and described separately, the distributed ledger 109 can also be included in or operate as a component of the computing environment 101 in various embodiments of the present disclosure.

The network 118 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 118 can also include a combination of two or more networks 118. Examples of networks 118 can include the Internet, intranets, extranets, virtual private networks (VPNs), and similar networks.

The computing environment 101 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 101 can employ a plurality of computing devices that can be arranged in one or more server banks or computer banks or other arrangements. Such computing devices can be located in a single installation or can be distributed among many different geographical locations. For example, the computing environment 101 can include a plurality of computing devices that together can include a hosted computing resource, a grid computing resource or any other distributed computing arrangement. In some cases, the computing environment 101 can correspond to an elastic computing resource where the allotted capacity of processing, network, storage, or other computing-related resources can vary over time.

Various applications or other functionality can be executed in the computing environment 101. The components executed on the computing environment 101 include a DID management service 103, and other applications, services, processes, systems, engines, or functionality not discussed in detail herein.

Also, various data is stored in a datastore 119 that is accessible to the computing environment 101. The datastore 119 can be representative of a plurality of datastores 119, which can include relational databases or non-relational databases such as object-oriented databases, hierarchical databases, hash tables or similar key-value datastores, as well as other data storage applications or data structures. Moreover, combinations of these databases, data storage applications, and/or data structures may be used together to provide a single, logical, datastore. The data stored in the datastore 119 is associated with the operation of the various applications or functional entities described below. This data can include DID data such as relationship DIDs 121; informational DIDs 123 with one or more attributes 125, chip DIDs 127; relationship DID criteria 130 including VC criteria as well as alternative or non-VC criteria 136; attribute preauthorization data 139, an attribute presentation history 141, and potentially other data.

The distributed ledger 109 can represent any repository or other system for storing current and/or historical DID data and other information from a variety of DID-backed systems, services, and processes in a decentralized repository. A distributed ledger 109 can include one or more relational databases or non-relational databases such as object-oriented databases, hierarchical databases, hash tables or similar key-value datastores, as well as other data storage applications or data structures hosted by one or more computing devices. Data stored in the distributed ledger 109 can include relationship DIDs 121, as well as DIDs that are linked or logically associated with one or more relationship DIDs 121. This can include attribute or informational DIDs 123, chip DIDs 127, and others. Respective ones of the DIDs can be associated with a respective DID document 129.

The distributed ledger 109 can include at least one publicly accessible endpoint to access the DIDs. The distributed ledger 109 can include a network of devices limited to devices owned and operated by an entity that provides the DID management service 103. The distributed ledger 109 can alternatively include a network of devices that includes devices owned and operated by third parties in addition to or alternatively to those owned and operated by an entity that provides the DID management service 103.

A relationship DID 121 can refer to a DID that provides proof or evidence of a membership or other relationship between a holder entity and a particular issuer entity such a company, that employs the DID management service 103. As an illustrative example, a DID and its related components such as the DID document 129 can conform to a standard such as a decentralized identifier standard promoted or published by the World Wide Web Consortium (W3C) or another standards organization. The particular entity that issues the relationship DID 121 using the DID management service 103 can revoke the relationship DID 121. Likewise, any of the DIDs issued using the DID management service 103 can be revoked, in some cases unilaterally by the particular entity that issues the relationship DID 121 using the DID management service 103.

The relationship DID 121 can, in some instances, be limited to information that indicates proof of the relationship between a holder entity and a particular issuer entity. Other information can be logically linked to the relationship DID 121 in the datastore 119 and the distributed ledger 109. Generally, the relationship DID 121 can remain in force and unchanged as long as the holder has the specified relationship with the issuer entity. Limiting the information in the relationship DID 121 to information that indicates the relationship itself can enable a longer lasting more durable DID. Otherwise, if the relationship DID 121 included additional non-relationship attributes 125, the DID would be changed each the attributes 125 were updated. This would be inconvenient and inefficient for a holder and the DID management service 103 alike.

An informational DID 123 can refer to a DID that is logically linked to the relationship DID 121, and stores attributes 125 attributed to or associated with the holder. The attributes 125 can include or be indicated in the information DID 123 to be a specified class of information such as issuer-issued by an issuer entity, or self-issued by a holder. Issuer-issued attributes 125 can refer to informational items that are evaluated, confirmed, verified, or otherwise approved by the issuer entity that employs the DID management service 103. Issuer-issued attributes 125 can generally include important items such as a bank balance, credit limit, membership level, status identifiers, licensing information, governmental information, address information, and other verifiable data.

Self-issued attributes 125 can include information that is claimed or declared by the holder, without being evaluated, confirmed, verified, or otherwise approved by the issuer entity that employs the DID management service 103. Self-issued attributes 125 can include and sort of information discussed for issuer-issued attributes, but can generally be used for holder preferences, instructions, and desires that are best assessed or only assessable by the holder. Any of the attributes 125 can also indicate a category or type of information in a key-value manner or another structure that can provide further information. For example, a bank balance attribute 125 can indicate a key of "bank balance" and a value that indicates an amount of money.

A DID chip 142 can refer to a circuit chip that is capable of storing data that includes multiple DIDs, including a relationship DID 121 and a chip DID 127. The DID chip 142 can be embedded in a card such as a credit card, or any physical object or item. For instance, a DID chip 142 can be part of a smart card, chip card, or integrated circuit card (ICC or IC card) that provides contact-based or contactless data transfer. In further examples, the DID chip 142 can also be part of a radio frequency identification (RFID) tag. When an item that includes a DID chip 142 is presented to a verifier device 154, the DID management service 103 and distributed ledger 109 can identify this and can prevent or deny verification of either of the relationship DID 121 and the chip DID 127, unless both the relationship DID 121 and the chip DID 127 are concurrently valid and unrevoked. As a result, if a card or object that includes the DID chip 142 is lost, only the chip DID 127 is revoked. The relationship DID 121 can remain valid and in force without risk of identity theft and surreptitious use by users other than the approved holder.

A DID document 129 can refer to a document that is stored in a distributed ledger 109 to verify a DID such as a relationship DID 121, informational DID 123, chip DID 127, peer DID 161, or a VC 151. Verification of these items can also operate to verify attributes 125 specified by a DID or VC 151. A particular DID can point or resolve to a particular DID document 129 that includes a set of data describing the DID subject, including mechanisms, such as cryptographic public keys, that the DID subject or a DID delegate can use to verify the particular DID. For example, a DID document 129 can include the particular DID, a set of public keys, a set of authentication methods, a set of service endpoints for interaction, a timestamp of creation and/or access, and a cryptographic signature.

The relationship DID criteria 130 can include a set of criteria that are promulgated and required in order to join a network, become a member, or instate a relationship with a particular entity that issues the relationship DID 121 to confirms the relationship. For instance, the relationship DID criteria 130 can refer to criteria to become a card holding member of a group, or to become a network-approved vendor, among other types of relationships.

The VC criteria 133 can include criteria for which the entity that issues the relationship DID 121 prefers, requires, or expects to be proven using a first-party VC 151 or third-party VC 151 relative to the DID management service 103 and the holder. Non-VC criteria 136 can include criteria for which the entity that issues the relationship DID 121 prefers, requires, expects, or allows to be alternatively proven using a form, image, video, file, or other non-VC item.

The attribute preauthorization data 139 can include information that indicates an attribute preauthorization status for a particular attribute 125 or group of attributes 125 that the holder has explicitly specified. A default attribute preauthorization status can be a 'request' status that indicates to request authorization to provide or use the specified attribute 125 at the time of presentation of the relationship DID 121. Various preauthorization statuses can indicate whether the attribute 125 or group of attributes 125 can be used and/or provided. Using the attribute 125 can refer to accessing the information to prove a claim without providing the verifier with a specific value indicated for the attribute 125. Providing the attribute 125 can include accessing the attribute 125 and ultimately providing the verifier with the specific value indicated for the attribute 125. For example, a verifier service 112 may desire to verify a claim indicating a relationship that relies on the value, such as 'the holder has a credit score of at least 600.' This can be verified without providing an exact credit score, where the credit score can be a value indicated for an attribute 125.

Various preauthorization statuses can also indicate that certain first or third-party verifier services 112 or entities are allowed or denied use of the attribute 125, while others are allowed or denied providing specific values for the attribute 125. Various preauthorization statuses can also indicate whether an authorization request should be provided, whether authorization should be automatically approved, or whether authorization should be automatically denied for use or provision of the attribute 125 generally and for specific verifier services 112 or entities.

The attribute presentation history 141 can include a timestamped history of which attributes 125 have been denied from, used by, or provided to which entities or verifier services 112. The attribute presentation history 141 can include an indication of whether a value of an attribute 125 was provided or whether an attribute 125 was used to prove a specified claim. The attribute presentation history 141 can indicate whether access to the attribute 125 was denied or authorized in response to an explicit request authorized or automatically based on a preauthorization status.

The client device 106 is representative of a plurality of client devices that can be coupled to the network 118. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 145, such as liquid crystal displays (LCDs), gas plasma-based flat panel displays, organic light emitting diode (OLED) displays, electrophoretic ink ("E-ink") displays, projectors, or other types of display devices. In some instances, the display 145 can be a component of the client device 106 or can be connected to the client device 106 through a wired or wireless connection.

The client device 106 can be configured to execute various applications such as a client application 147 or other applications. The client application 147 can be executed in a client device 106 to access network content served up by the computing environment 101 or other servers, thereby rendering a user interface 156 on the display 145. To this end, the client application 147 can include a browser, a dedicated application, or other executable, and the user interface 156 can include a network page, an application screen, or other user mechanism for obtaining user input. The client device 106 can be configured to execute applications beyond the client application 147 such as email applications, social networking applications, word processors, spreadsheets, or other applications.

The client device 106 can also include one or more VCs 151. A particular VC 151 can also be stored or included in one or more of the datastore 119, a datastore of the third-party DID issuer service 115, and the distributed ledger 109 in various examples. A VC 151 can refer to a DID-backed document or file that once issued can be securely stored by a credential holder such as a digital wallet application 147.

The verifier service 112 can provide any consumer, commercial, industrial, or any other service to various DID holders. DID holders can refer to users or individuals that have a relationship defined in a relationship DID 121. A DID holder can store the relationship DID 121 in a client device 106 and an item that includes a DID chip 142 in various examples. The verifier service 112 can verify the relationship by performing a cryptographic or other verification process that verifies the authenticity of the relationship DID 121. The verifier service 112 can also verify items various attributes 125 that are presented using one or more of a peer DID 161, a VC 151, and other DID-backed presentation data. The verifier service 112 can verify various attributes 125 any consumer, commercial, industrial, or any other service to various DID holders in order to provide certain services to the holder.

The verifier service 112 can include a verifier device 154 such as a server device, a terminal, a kiosk, a card reader, a router that generates a wired or wireless network, a beacon that broadcasts a signal that is detectable by the client device 106. The verifier device 154 can also include a client device 106 that is utilized by the verifier service 112.

The third-party DID issuer service 115 can issue VCs 151, various DIDs, and other information that is backed using a separate distributed ledger 109 or the same distributed ledger 109 as the DID management service 103. The third-party DID issuer service 115 can be employed or provided by any entity including individuals, enterprises, governments, and other entities.

The peer DID 161 can refer to a DID that can be implemented on a peer-to-peer basis. The devices such as a client device 106 can create a DID document with a set of VCs 151 to provide to a verifier device 154 of a service provider. Peer DIDs 161 can be stored in data stores and devices controlled by the parties involved in the transmission, rather than being available publicly in a distributed ledger 109.

The following sequence diagrams provide a general description of the operation of the various components of the networked environment 100. Although the general descriptions can provide provides an example of the interactions between the various components of the networked environment 100, other interactions between the various components of the networked environment 100 are also possible according to various embodiments of the present disclosure. Interactions described with respect to a particular figure or sequence diagram can also be performed in relation to the other figures and sequence diagrams herein.

Figure 2:
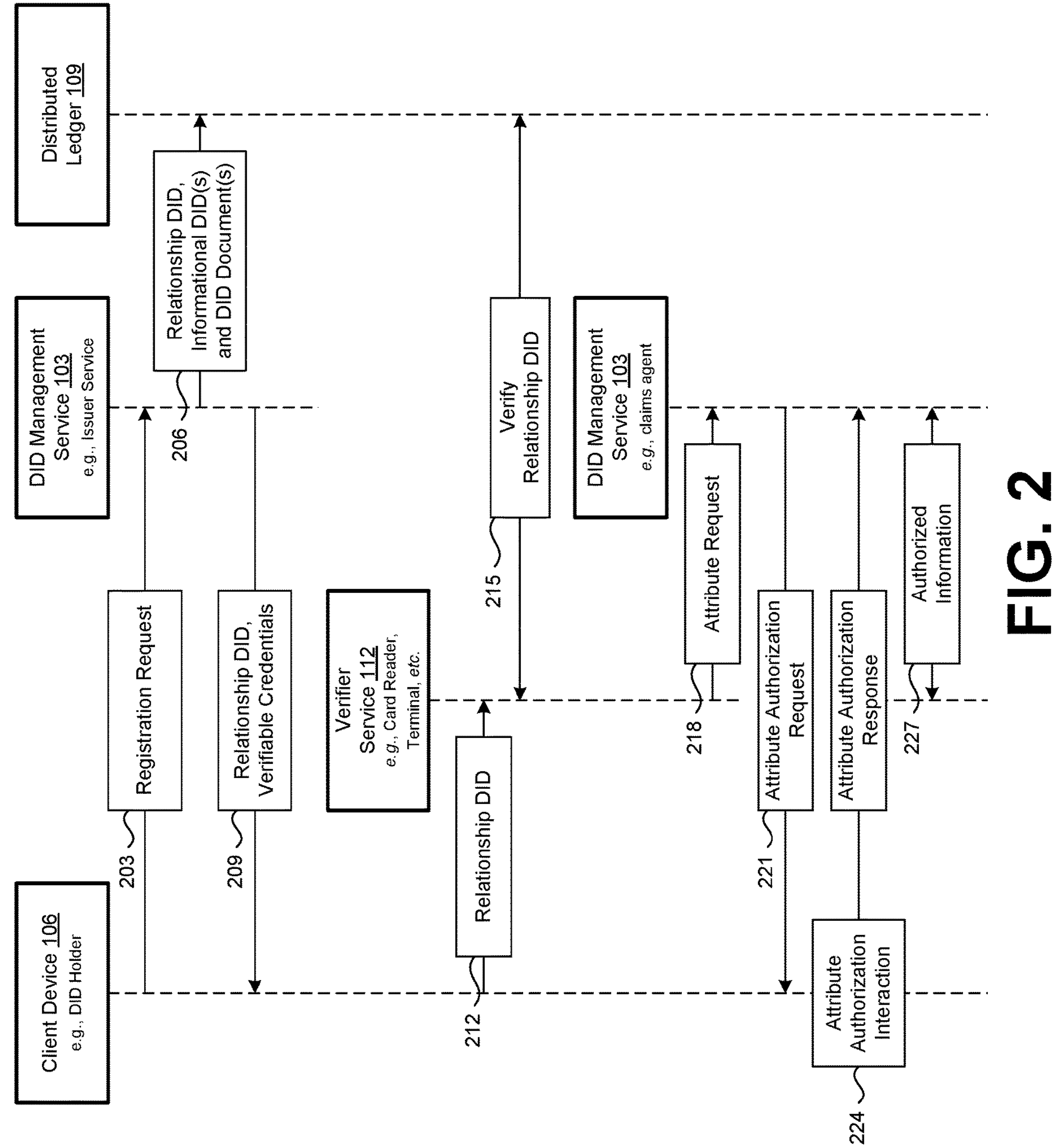
FIG. 2 is a sequence diagram illustrating the interactions between portions of the networked environment of FIG. 1 according to various embodiments of the present disclosure.

Referring next to FIG. 2, shown is a sequence diagram that provides one example of the interactions between the components of the networked environment 100 for managing access to attributes 125 using relationship DIDs 121. The sequence diagram of FIG. 2 provides merely an example of the many different types of functional arrangements that can be employed to implement the depicted interactions between the components of the networked environment 100. As an alternative, the sequence diagram of FIG. 2 can be viewed as depicting an example of elements of a method implemented within the networked environment 100.

Beginning with block 203, the client device 106 can transmit a registration request to the DID management service 103. The registration request can request to instate a relationship such as a membership with a company that provides identity services, fiscal services, consumer services, information services, and other types of services. The relationship can also include a company joining as a member of a business network that enables services provided and managed by the DID management service 103 and related components.

The registration request can include information about the entity requesting to instate the relationship. The various items of information can be provided through a form, a file, streaming image, audio, or video data, and other information. The items of information can form the basis for various attributes 125.

In block 206, the DID management service 103 can process the registration request to generate a relationship DID 121 and store it in the distributed ledger 109. The DID management service 103 can determine whether to instate the relationship and generate a relationship DID 121 that provides a decentralized globally unique identifier as verifiable proof of the relationship. The DID management service 103 can use machine instruction based review as well as generate a user interface that surfaces or displays the information for manual administrative review. If the information matches a predetermined review criteria, then the DID management service 103 can generate a relationship DID 121 and store it in the distributed ledger 109 in association with a DID document 129.

The DID management service 103 can also extract items of information from the registration request and/or from subsequent data transmissions between the client device 106 and the DID management service 103. The DID management service 103 can use these items of information to identify attribute types and attribute values to generate attributes 125. The DID management service 103 can generate one or more informational DIDs 123 that store these attributes 125. Generally, an informational DID 123 can include one or more attributes 125. While each attribute 125 can be stored in a separate informational DID 123, a single informational DID 123 can store all of the attributes 125 or any specified subset of attributes 125 for a holder. For example, an informational DID 123 can be assigned a particular category that encompasses a number of attribute types. The DID management service 103 can use different informational DIDs 123 of various categories of information stored in association with a holder.

In block 209, the DID management service 103 can transmit the relationship DID 121 to the client device 106. The DID management service 103 can also provide VCs 151 corresponding to the attributes 125 that are backed by the one or more informational DIDs 123. In some examples, only the relationship DID 121 is provided to the holder, and the holder can present the relationship DID 121 to enable secure access to the attributes 125 tracked and managed by the DID management service 103.

In block 212, the client device 106 can transmit the relationship DID 121 to the verifier service 112 or a verifier device 154. This action can be part of an attribute access process that includes the actions described for blocks 212 through 230. The verifier service 112 can desire or require a valid relationship in order to provide data content, in person content, or another service for the holder. The verifier service 112 can additionally or alternatively require confirmation of an attribute 125, or a claim that is based on the attribute 125. For example, the verifier service 112 may require a threshold or particular credit limit, credit score, bank balance, government license, age, or other attribute value that is tracked by an attribute 125 that is verifiable using the informational DIDs 123 and DID documents 129 stored in the distributed ledger 109. Rather than storing this information and providing it using the client device 106, the information can be secured using the attribute access process.

In block 215, the verifier service 112 can verify the relationship DID 121. A DID document 129 can include one or more verification methods, such as cryptographic public keys, which can be used to verify the authenticity of the relationship DID 121. Verification methods can take one or many parameters. An example of this is a set of cryptographic keys from which a threshold number are required to contribute to a cryptographic threshold signature.

In block 218, the verifier service 112 can transmit an attribute request that specifies an attribute 125. While referred to as an attribute request, the information requested can include a request to confirm or refute a claim, rather than to request the specific value stored for the attribute 125. The attribute request can include an expression that can evaluated to determine whether the attribute 125 complies with a claim that specifies a logical relationship between a value of the attribute and one or more predetermined values.

A claim can include a logical relationship between a value of an attribute 125 and one or more predetermined values. For example, a claim can request to conform or refute that the holder of the provided relationship DID 121 has a credit score related to a specified value by a specified logical operator such as greater than, greater than or equal to, equal to, less than or equal to, less than, and so on. The attributes 125 can include information that is issuer verified by the DID management service 103. However, the verifier service 112 can also request certain requested information that can be self verified or holder verified by the holder of the relationship DID 121, and that is not currently stored as a verified attribute 125.

In block 221, in order to secure the requested information, the DID management service 103 can transmit an attribute authorization request to the client device 106. The attribute authorization request can be transmitted by default. However, in an instance in which the holder has provided preauthorization to provide certain attributes 125 to specified verifier services 112, the DID management service 103 can identify a holder's explicit approval to provide the information based on attribute preauthorization data 139. In that scenario, the attribute authorization request is not transmitted in response to the attribute request, but the holder's explicit approval to provide the information is nevertheless identified.

In block 224, the attribute authorization request can cause the client device 106 to surface a notification or other user interface 149. The client application 147 or other instructions executed by the client device 106 can generate the user interface 149 that requests authorization for the DID management service 103 to provide the verifier service 112 with information based on the attributes 125 specified in the informational DIDs 123 for the holder.

In some examples, a user can select the notification user interface element to open the user interface 149. The notification and/or the user interface 149 can specify an identity of the verifier service 112, the claim or other information requested, and the attribute 125 that is to be used to verify the information. The notification and the user interface 149 can also include user interface elements that enable the holder to approve or deny authorization to verify a claim or access the value of the attribute 125. The client application 147 can identify a user selection of a user interface element, and the client device 106 can transmit an attribute authorization response to the DID management service 103.

In block 227, if the attribute authorization response authorizes the requested information, then the DID management service 103 can provide the authorized information to the verifier service 112. In some examples, this can include transmitting a peer DID 161, a VC 151, or a parameter to the verifier service 112. The verifier service 112 can verify the peer DID 161 or VC 151 or can access the parameter that includes the requested information. The verifier service 112 can then provider the holder with a service based on the additional information.

Figure 3:
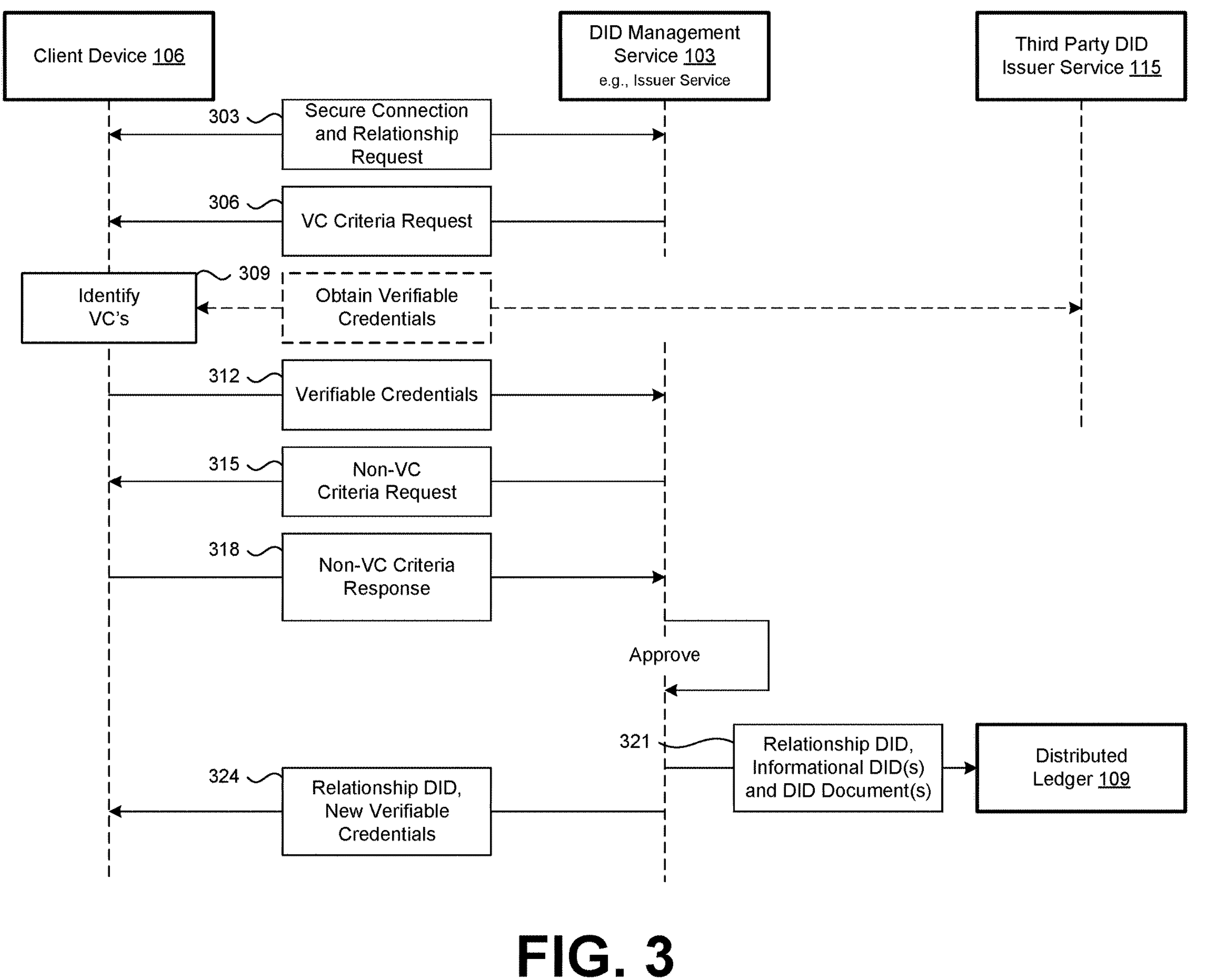
FIG. 3 is a sequence diagram illustrating the interactions between portions of the networked environment of FIG. 1 according to various embodiments of the present disclosure.

Moving to FIG. 3, shown is a sequence diagram that provides an example of the interactions between the components of the networked environment 100 for using VCs 151 to streamline establishing a relationship that is preserved using a relationship DID 121. The sequence diagram of FIG. 3 provides merely an example of the many different types of functional arrangements that can be employed to implement the depicted interactions between the components of the networked environment 100. As an alternative, the sequence diagram of FIG. 3 can be viewed as depicting an example of elements of a method implemented within the networked environment 100.

In block 303, the client device 106 and the DID management service 103 can establish a secure connection. The secure connection can include exchanging peer DIDs 161. The secure connection can also include an exchange of certificates and other authentication data between the client device 106 and the DID management service 103. The DID management service 103 can then receive a relationship request to instate a relationship, such as a joining a business network, becoming a member, or another predefined relationship type.

The registration request can request to instate a relationship such as a membership with a business network that enables services provided and managed by the DID management service 103 and related components. The relationship can also include an individual joining a membership with a company that provides identity services, fiscal services, consumer services, information services, and other types of services.

In block 306, the DID management service 103 can transmit a VC criteria request to the client device 106. The VC criteria request can specify the VC criteria 133, including a list of third-party VCs 151 that can be used as prerequisites to establish a relationship. These third-party VCs 151 can be used to speed up the onboarding and relationship establishment process. Rather than manually reviewing all documents, this VC-based process can leverage preestablished third-party VCs 151 that are issued by a third-party relative to the DID management service 103 and the holder.

In block 309, the client device 106 can identify VCs 151. The VC criteria request can cause the client device 106 to generate a user interface 149 that specifies the list of third-party VCs 151. The user interface 149 can also provide user interface elements that enable a user to select or provide the third-party VCs 151 from a wallet application, a datastore accessible to the client device 106, or a network service. The client device 106 can also retrieve or otherwise obtain the VCs 151 from a third-party DID issuer service 115 or another network service, store them in a wallet or datastore, and then select the third-party VCs 151 from the user interface 149.

In block 312, the client device 106 can transmit the third-party VCs 151 to the DID management service 103. The DID management service 103 can receive the third-party VCs 151. The DID management service 103 can cryptographically verify authenticity of the third-party VCs 151. Further VC criteria requests can be transmitted, and the user interface 149 can be updated to request the additional VCs 151 until all required VCs 151 are obtained. In this context, a required VC 151 can refer to a VC 151 for which there are no non-VC criteria 136 that are listed as alternatives.

In block 315, the DID management service 103 can transmit a non-VC criteria request. The non-VC criteria request can be transmitted after the VC criteria request and response are performed, in order to encourage use of VCs 151 rather than traditional file, form, and other non-VC criteria 136. The non-VC criteria request can cause the client device 106 to generate a user interface 149 that specifies the list of non-VC criteria 136.

The user interface 149 can also provide user interface elements that enable fill, enter, or provide the non-VC criteria 136. The user interface 149 can enable a user to select items that fulfill non-VC criteria 136 from a datastore accessible to the client device 106, or a network service. The client device 106 can also retrieve or otherwise obtain the non-VC criteria 136 from a network service and then select the non-VC criteria 136 from the user interface 149.

In block 318, the client device 106 can transmit a response to the non-VC criteria request. The client device 106 can transmit the items fulfilling the non-VC criteria 136 to the DID management service 103. The DID management service 103 can receive the items fulfilling the non-VC criteria 136 and can manually or programmatically confirm that the non-VC criteria 136 are fulfilled. Further non-VC criteria requests can be transmitted, and the user interface 149 can be updated to request the additional VCs 151 until sufficient criteria are fulfilled to approve and instate the relationship.

In block 321, the DID management service 103 can generate a relationship DID 121 and store it in the distributed ledger 109. Based on the VCs 151 provided for to the VC criteria 133, and the items provided for the non-VC criteria 136, the DID management service 103 can determine to instate the relationship requested in block 303. The DID management service 103 can generate a relationship DID 121 that provides a decentralized globally unique identifier as verifiable proof of the relationship. The relationship DID 121 can be stored in the distributed ledger 109 in association with a DID document 129.

The DID management service 103 can also extract items of information from the registration request, the VCs 151 provided for the VC criteria 133, and the items provided for the non-VC criteria 136. The DID management service 103 can use this data to generate attributes 125. The DID management service 103 can generate one or more informational DIDs 123 that include these attributes 125. The informational DIDs 121 can be stored in the distributed ledger 109 in association with a DID document 129. The informational DIDs 121 can also be logically linked to the relationship DID 121.

In block 324, the DID management service 103 can transmit the relationship DID 121 to the client device 106. The DID management service 103 can also provide VCs 151 corresponding to the attributes 125 that are backed by the one or more informational DIDs 123. In some examples, only the relationship DID 121 is provided, and the holder can present the relationship DID 121 to enable secure access to the attributes 125 tracked and managed by the DID management service 103.

Figure 4:
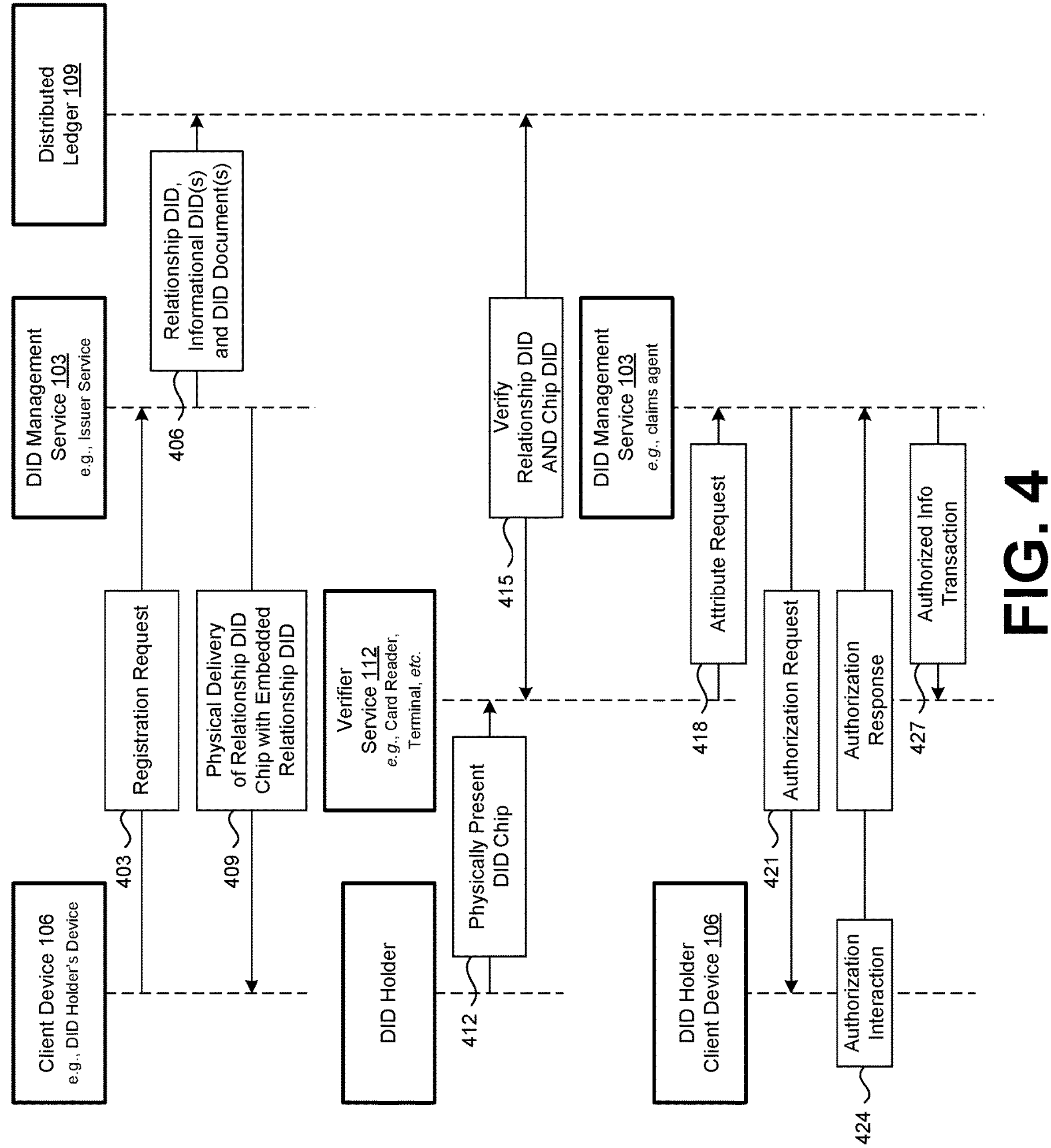
FIG. 4 is a sequence diagram illustrating the interactions between portions of the networked environment of FIG. 1 according to various embodiments of the present disclosure.

Referring next to FIG. 4, shown is a sequence diagram that provides one example of the interactions between the components of the networked environment 100 for managing access to attributes 125 using DID chips 142. The sequence diagram of FIG. 4 provides merely an example of the many different types of functional arrangements that can be employed to implement the depicted interactions between the components of the networked environment 100. As an alternative, the sequence diagram of FIG. 4 can be viewed as depicting an example of elements of a method implemented within the networked environment 100.

Beginning with block 403, the client device 106 can transmit a registration request to the DID management service 103. The registration request can request to instate a relationship such as a membership with a business network that enables services provided and managed by the DID management service 103 and related components. The relationship can also include an individual joining a membership with a company that provides identity services, fiscal services, consumer services, information services, and other types of services. The registration request can include information about the entity requesting to instate the relationship, or additional information can be provided subsequent to the registration request. The various items of information can be provided through a form, a file, streaming image, audio, or video data, and other information. The items of information can form the basis for various attributes 125.

In block 406, the DID management service 103 can process the registration request to generate a relationship DID 121 and store it in the distributed ledger 109. The DID management service 103 can determine whether to instate the relationship and generate a relationship DID 121 that provides a decentralized globally unique identifier as verifiable proof of the relationship. The DID management service 103 can use machine instruction based review as well as generate a user interface that surfaces or displays the information for manual administrative review. If the information matches a predetermined review criteria, then the DID management service 103 can generate a relationship DID 121 and store it in the distributed ledger 109 in association with a DID document 129.

The DID management service 103 can also extract items of information from the registration request and/or from subsequent data transmissions between the client device 106 and the DID management service 103. The DID management service 103 can use these items of information to identify attribute types and attribute values to generate attributes 125. The DID management service 103 can generate one or more informational DIDs 123 that store these attributes 125.

In block 409, the DID management service 103 can manufacture a DID chip 142. Alternatively, the chip can be manufactured by others. The DID management service 103 can generate and embed a unique chip DID 127 and the relationship DID 121 in the DID chip 142 or circuit. The chip DID 127 can refer to a chip-specific DID that indicates and verifies that the DID chip 142 is a valid DID chip 142. As long as the chip DID 127 of the DID chip is valid, the DID chip 142 can be used to access attributes 125 from informational DIDs 123 that are associated with the relationship DID 121 that is also in the DID chip 142.

In block 412, the client device 106 can physically present or use the DID chip 142 at a point of sale such as a verifier device 154 that is associated with the verifier service 112.

This can include inserting, tapping, or otherwise bringing the DID chip 142 into the appropriate position or proximity to the verifier device 154. In some examples the verifier device 154 can be a device that is owned and operated by an entity that is federated with or has a relationship with the verifier service 112.

In block 415, the verifier service 112 can verify the relationship DID 121 and the chip DID 127. In some examples, the DID 121 and the chip DID 127 can be digitally combined or logically linked by instructions or operation of the DID chip 142 and the verifier device 154. This can ensure that any time the DID chip 142 is presented, both the relationship DID 121 and the chip DID 127 are provided, and both must be concurrently valid in order to approve or verify the presentation of the DID chip 142. In some examples, the relationship DID 121 and the chip DID 127 can be presented as data within a peer DID 161, a VC 151. The relationship DID 121 and the chip DID 127 can also be provided in a single encrypted package that ensures both the relationship DID 121 and the chip DID 127 must be concurrently valid in order to approve or verify the presentation of the DID chip 142.

In block 418, once the relationship DID 121 and the chip DID 127 are both verified to be valid, the verifier service 112 can transmit an attribute request that specifies an attribute 125. While referred to as an attribute request, the information requested can include a request to confirm or refute a claim, rather than to request the specific value stored for the attribute 125. A claim can include a logical relationship between a value of an attribute 125 and one or more predetermined values. For example, a claim can request to conform or refute that the holder of the provided relationship DID 121 has a credit score related to a specified value by a specified logical operator such as greater than, greater than or equal to, equal to, less than or equal to, less than, and so on. The attributes 125 can include information that is issuer verified by the DID management service 103. However, the verifier service 112 can also request certain requested information that can be self verified or holder verified by the holder of the relationship DID 121, and that is not currently stored as a verified attribute 125.

In block 421, in order to secure the requested information, the DID management service 103 can transmit an attribute authorization request to the client device 106. The attribute authorization request can be transmitted by default. However, in an instance in which the holder has provided preauthorization to provide certain attributes 125 to specified verifier services 112, the DID management service 103 can identify a holder's explicit approval to provide the information based on attribute preauthorization data 139. In that scenario, the attribute authorization request is not transmitted in response to the attribute request, but the holder's explicit approval to provide the information is nevertheless identified.

In block 424, the attribute authorization request can cause the client device 106 to surface a notification or other user interface 149. The client application 147 or other instructions executed by the client device 106 can generate the user interface 149 that requests authorization for the DID management service 103 to provide the verifier service 112 with information based on the attributes 125 specified in the informational DIDs 123 for the holder.

In some examples, a user can select the notification user interface element to open the user interface 149. The notification and/or the user interface 149 can specify an identity of the verifier service 112, the claim or other information requested, and the attribute 125 that is to be used to verify the information. The notification and the user interface 149 can also include user interface elements that enable the holder to approve or deny authorization to verify a claim or access the value of the attribute 125. The client application 147 can identify a user selection of a user interface element, and the client device 106 can transmit an attribute authorization response to the DID management service 103.

In block 427, if the attribute authorization response authorizes the requested information, then the DID management service 103 can provide the authorized information to the verifier service 112. In some examples, this can include transmitting a peer DID 161, a VC 151, or a parameter to the verifier service 112. The verifier service 112 can verify the peer DID 161 or VC 151 or can access the parameter that includes the requested information. The verifier service 112 can then provider the holder with a service based on the additional information.

Figure 5:
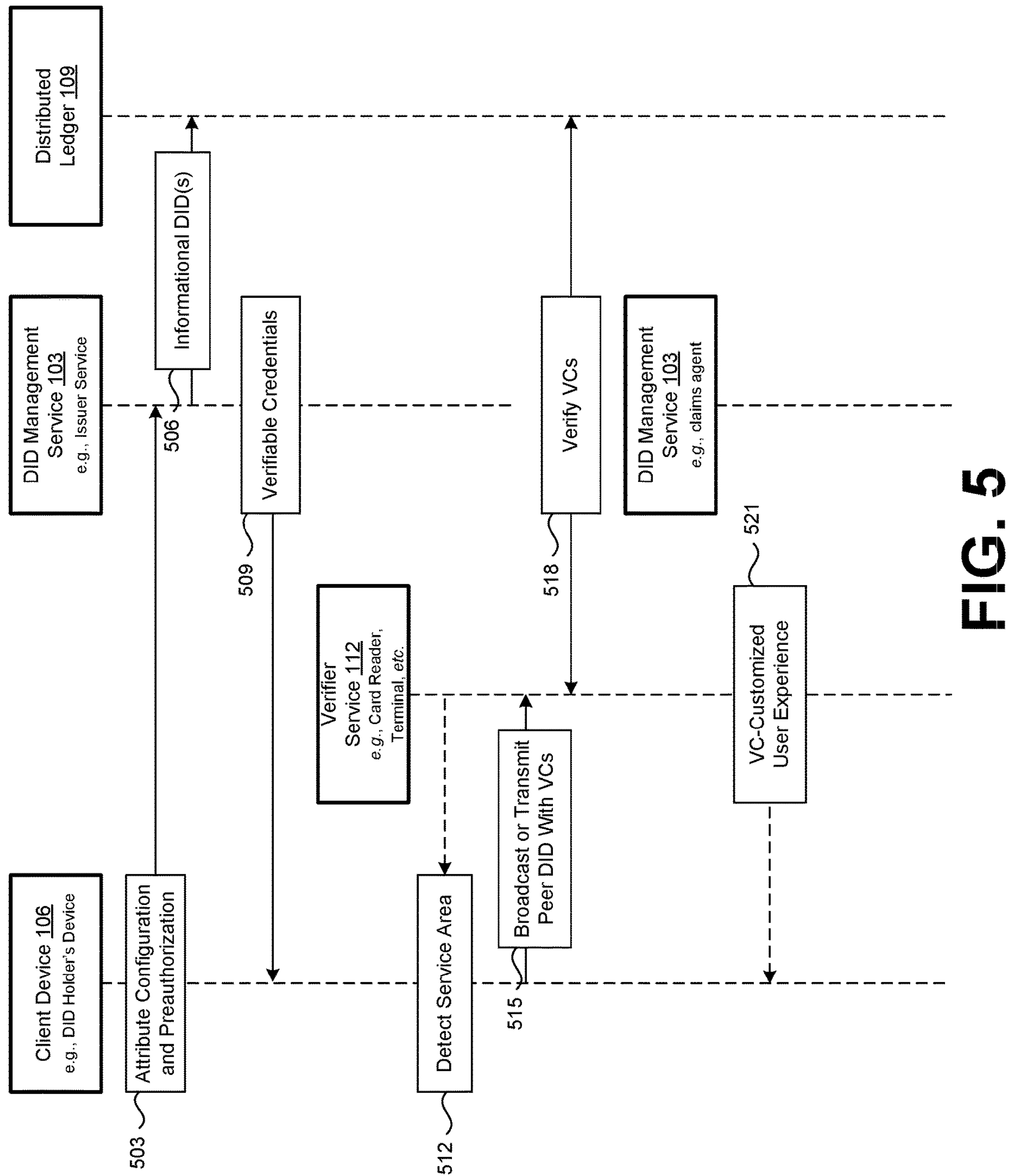
FIG. 5 is a sequence diagram illustrating the interactions between portions of the networked environment of FIG. 1 according to various embodiments of the present disclosure.

Referring next to FIG. 5, shown is a sequence diagram that provides one example of the interactions between the components of the networked environment 100 for managing access to attributes 125 using automatically provided peer DIDs 161 that include VCs 151. The sequence diagram of FIG. 5 provides merely an example of the many different types of functional arrangements that can be employed to implement the depicted interactions between the components of the networked environment 100. As an alternative, the sequence diagram of FIG. 5 can be viewed as depicting an example of elements of a method implemented within the networked environment 100.

In block 503, the client device 106 can identify attribute 125 configurations and preauthorizations for the provided attributes 125. The attributes 125 in this example can include any of the attributes 125 previously discussed, but can particularly be useful for holder preferences and holder-issued attributes 125. The client application 147 can generate a user interface 149 through which the user can interact with user interface elements to enter, select, upload, or otherwise provide attributes 125 and attribute preauthorization data 139. At this point, the holder associated with the client device 106 can already have a relationship backed by a relationship DID 121.

In block 506, the DID management service 103 can process the information provided through the user interface 149 to generate data comprising attributes 125. The DID management service 103 can generate or update one or more informational DIDs 123 in the distributed ledger 109 to include the attributes 125. This can include generating or updating DID documents 129. The informational DIDs 123 generated using the information provided through the user interface 149 can be logically linked with the relationship DID 121 of the holder associated with the client device 106 that provided the information.

In block 509, the DID management service 103 can transmit VCs 151 to the client device 106. The client device 106 can store these VCs 151 in the client device 106. The client device 106 can also secure the VCs 151 within a wallet client application 147. These VCs 151 can be logically associated with a parameter or instructions that cause the wallet client application 147 or another client application 147 to automatically provide these VCs 151 under specified circumstances. The specified circumstances can include events such as client device 106 detection of a service area of a specified verifier service 112 or verifier device 154.

In block 512, the client device 106 can detect a service area of the verifier service 112 or verifier device 154. For example, the client device 106 can detect a beacon broadcast by the verifier device 154 or a predetermined local area network or peer network generated by the verifier device 154. Alternatively, the client device 106 can internally detect a GPS location, a network triangulated location, or any physical location verified using hardware of the client device 106. This can include client device 106 identifying its own physical location with or without using or detecting data from the verifier device 154.

In block 515, the client device 106 can broadcast or transmit a peer did 161 that includes the VCs 151. In instances in which the physical location is associated with a particular verifier service 112, the client device 106 can provide a set of VCs 151 that is limited to those logically associated with the identified verifier service 112. The attributes 125 and the set of VCs 151 can also be indicated to be preauthorized for the identified verifier service 112 in attribute preauthorization data 139 stored in the client device 106 and the computing environment 101.

In block 518, the verifier service 112 can verify the VCs 151. In some examples, the verifier service 112 can communicate with the DID management service 103 or the distributed ledger 109 in order to verify the VCs 151. In other examples, the VCs 151 can be verified using a process that does not include communications with the DID management service 103 or the distributed ledger 109.

In block 521, the verifier service 112 can provide a customized user experience for the holder of the client device 106. This can include providing an in-person service for the holder of the client device 106 or generating and transmitting a customized user interface 149 for display using the client device 106, according to the attributes 125 specified in the VCs 151. The verifier service 112 can provide an in-person service for the holder of the client device 106 by generating a user interface element on a verifier device 154 that provides an employee of the verifier service 112 to provide the in-person service according to the attributes 125 specified in the VCs 151.

In one example, a holder that is allergic to nuts, dairy, gluten, shellfish, can express a food item preference by specifying attributes 125 in block 503. When the holder's client device 106 enters a service area associated with a restaurant corresponding to a verifier service 112, the client device 106 can transmit the VCs 151 indicating food preferences, allergies, and other preauthorized information backed by attributes 125 managed by the DID management service 103. The verifier service 112 can use the provided information to customize a digital or physical menu provided to the holder and can even greet the holder by name if the name is a preauthorized attribute 125. Additional information can also be requested, approved, provided, and utilized through the approval process described in FIGS. 2 and 4.

Figures 6, 7:
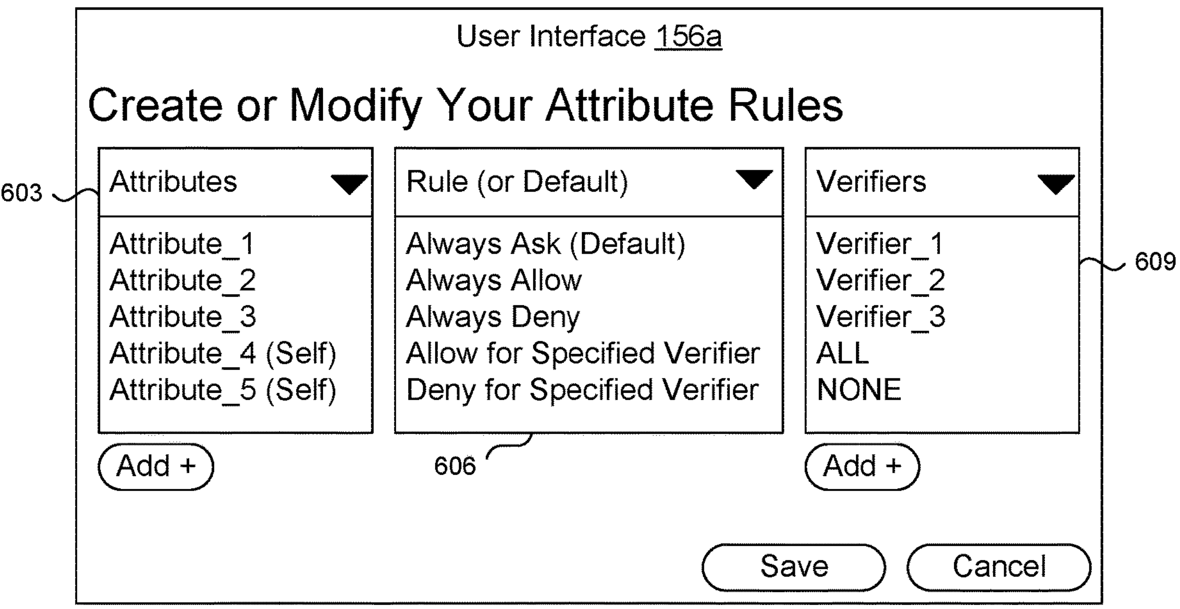
FIG. 6 is a pictorial diagram of an example user interface presented by a client device in the networked environment of FIG. 1 according to various embodiments of the present disclosure.
FIG. 7 is a pictorial diagram of an example user interface presented by a client device in the networked environment of FIG. 1 according to various embodiments of the present disclosure.

In FIG. 6, a user can interact with a user interface element 603 of the user interface **156*a* to select attributes 125 from a list of existing attributes 125 identified by the DID management service 103. A user can also add a new attribute 125 by selecting the add user interface element, which can be updated the user interface 156*a* to include elements through which the new attribute 125 can be specified and related information can be provided so the DID management service 103 can confirm it and store the new attribute 125 in an informational DID 123. The user interface 156*a* can also include a user interface element 606 that the user can interact with to specify a rule that governs preauthorization according to the rule. The user interface 156*a* can also include a user interface element 609 that the user can interact with to specify a rule that governs which verifier services 112 the rule for the attribute 125** applies to.

In FIG. 7, a user can interact with user interface elements of a user interface **156*b* to approve or deny an attribute authorization request for a specified attribute 125 and verifier service 112. In an instance in which the verifier service 112 desires additional information or preferences that are not currently specified in the attributes 125, the user interface 156*b* can also include a user interface element through which the user can provide the verifier service 112 with this information. In some examples, this data can also be transmitted from the client device 106 to the DID management service 103 for addition as a user- or holder-issued attribute 125**.

Figures 8, 9:
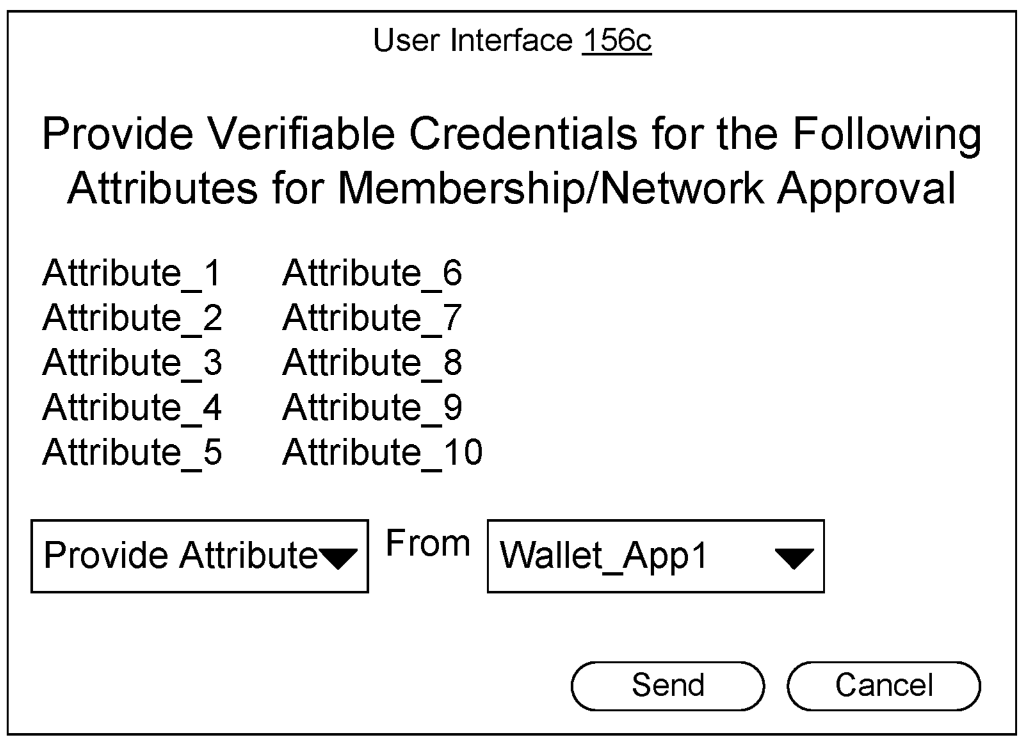
FIG. 8 is a pictorial diagram of an example user interface presented by a client device in the networked environment of FIG. 1 according to various embodiments of the present disclosure.
FIG. 9 is a pictorial diagram of an example user interface presented by a client device in the networked environment of FIG. 1 according to various embodiments of the present disclosure.

In FIG. 8, a user can interact with user interface elements of a user interface **156*c* to provide third-party VCs 151 with attributes 125 that are VC criteria 133 used to instate a relationship. The user interface elements can include a selector or other user interface element that enables the user to select one or more of the specified attributes 125, and another user interface element that enables the user to select a wallet, datastore, or network location where the specified attributes 125 can be obtained. The user can then select a send element to transmit the third-party VCs 151 to the DID management service 103. In FIG. 9, a user can interact with user interface elements of a user interface 156*d* to provide information through forms, images, files, and selections as alternative or non-VC criteria 136**.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

at least one computing device comprising at least one processor and at least one memory; and machine-readable instructions stored in the at least one memory that, when executed by the at least one processor, cause the at least one computing device to at least:

perform at least a portion of a verification process using a relationship decentralized identifier (DID) presented by a holder, wherein the relationship DID provides proof of a relationship between the holder and a DID management service and the relationship DID is stored in a distributed ledger;

transmit an attribute request to the DID management service, wherein the attribute request specifies an attribute stored in an informational DID logically associated with the relationship DID; and receive the attribute or information generated using the attribute, wherein the attribute or the information is received from the DID management service based at least in part on an authorization response transmitted to the DID management service from a client device of the holder.

2. The system of claim 1, wherein the relationship DID is presented using a physical item comprising the relationship DID and a chip DID that is specific to a chip embedded in the physical item.

3. The system of claim 2, wherein the verification process comprises a concurrent validation of the relationship DID and the chip DID as a criteria for approval or verification of a presentation of the relationship DID and the chip DID using the physical item.

4. The system of claim 1, wherein the authorization response is transmitted from the client device of the holder to the DID management service based at least in part on a user selection of a user interface element on the client device.

5. The system of claim 4, wherein the user interface element is generated based at least in part on the client device receiving, from the DID management service, an attribute authorization request that specifies the attribute.

6. The system of claim 1, wherein the attribute request specifies the information, and the information comprises an expression that can evaluated by the machine-readable instructions to determine whether the attribute complies with a claim that specifies a logical relationship between a value of the attribute and one or more predetermined values.

7. The system of claim 1, wherein the machine-readable instructions further cause the at least one computing device to at least:

transmit a registration request from the client device to the DID management service;

store, by the DID management service, the relationship DID and the informational DID in a distributed ledger; and receive, by the client device, the relationship DID as a response that is based at least in part on the registration request.

8. A system, comprising:

a computing device comprising at least one processor and at least one memory; and machine-readable instructions stored in the at least one memory that, when executed by the at least one processor, cause the computing device to at least:

establish, between the computing device and a decentralized identifier (DID) management service, a secure connection based at least in part on a peer DID;

transmit, to the DID management service, a relationship request using the secure connection;

receive, from the DID management service, a verifiable credential request that identifies at least one verifiable credential as criteria to instate the relationship;

transmit the at least one verifiable credential to the DID management service to fulfill the criteria; and receive, from the DID management service, a relationship DID that provides proof of the relationship.

9. The system of claim 8, wherein the instructions, when executed by the processor of the computing device, cause the computing device to at least:

receive, from the DID management service, a request that identifies at least one item of information as additional criteria or alternative criteria to instate the relationship; and transmit the at least one item to the DID management service to fulfill the additional criteria or the alternative criteria.

10. The system of claim 8, wherein the instructions, when executed by the processor of the computing device, cause the computing device to at least:

access or retrieve the at least one verifiable credential using a wallet application.

11. The system of claim 8, wherein the instructions, when executed by the processor of the computing device, cause the computing device to at least:

receive the at least one verifiable credential from a third-party issuer service that issues the at least one verifiable credential, wherein the third-party issuer service is a third party relative to the DID management service.

12. A method, comprising:

transmitting, by a client device to a decentralized identifier (DID) management service, preauthorization data that preauthorizes an attribute to be provided to enable a customized user experience;

receiving, by the client device from the DID management service, a verified credential that specifies the attribute;

detecting, by the client device, a service area associated with a verifier service, wherein the service area is detected based at least in part on a satellite position of the client device or a beacon broadcast by a verifier device of the verifier service; and transmitting, by the client device, the verified credential to the verifier service, wherein the verifier service provides the customized user experience based at least in part on the attribute specified by the verified credential.

13. The method of claim 12, wherein the verified credential is transmitted using a peer DID.

14. The method of claim 12, further comprising:

receiving, by the client device from the verifier service, instructions to generate or update a user interface on a display of the client device to customize the user interface based at least in part on the attribute; and generating or updating, by the client device, the user interface to customize the user interface based at least in part on the attribute.

15. The method of claim 12, further comprising:

generating or updating a user interface on a display of a verifier device to include instructions for a user of the verifier device to provide the customized user experience based at least in part on the attribute specified by the verified credential.

* * * * *